United States Patent
Robitaille et al.

(10) Patent No.: US 7,131,527 B2
(45) Date of Patent: Nov. 7, 2006

(54) LUMBER UNSCRAMBLER AND CONVEYOR

(75) Inventors: Pascal Andre Joseph Robitaille, La Sarre (CA); Martin Robert Rousseau, La Sarre (CA); Laurent Joseph Yvon Trudel, La Sarre (CA)

(73) Assignee: Tembec Industries Inc., Montreal (CA)

( * ) Notice: Subject to any disclaimer, the term of this patent is extended or adjusted under 35 U.S.C. 154(b) by 557 days.

(21) Appl. No.: 10/677,410

(22) Filed: Oct. 2, 2003

(65) Prior Publication Data

US 2005/0072492 A1    Apr. 7, 2005

(51) Int. Cl.
*B65G 25/00* (2006.01)

(52) U.S. Cl. .................. 198/773; 198/774.3; 198/777; 414/746.6

(58) Field of Classification Search .............. 198/773, 198/750.14, 774.1, 774.2, 774.3, 775, 777, 198/774.4; 414/746.2, 746.6
See application file for complete search history.

(56) References Cited

U.S. PATENT DOCUMENTS

| | | | | |
|---|---|---|---|---|
| 5,374,157 A | * | 12/1994 | Allard | 414/746.6 |
| 5,653,570 A | * | 8/1997 | Weirathmueller | 414/746.6 |
| 6,450,324 B1 | * | 9/2002 | Lindenblatt | 198/773 |
| 6,761,261 B1 | * | 7/2004 | Dussault et al. | 198/773 |

* cited by examiner

*Primary Examiner*—James R. Bidwell
(74) *Attorney, Agent, or Firm*—Carrithers Law Office PLLC; David W. Carrithers; Stanley E. Johnson

(57) ABSTRACT

A lumber unscrambler and conveyor having first and second rigid units mounted at an incline on a support structure. Each unit has a plurality of spaced apart parallel plates in series along the incline and parallel thereto. The plates on the respective first and second units are interleaved in alternate relation. The plates have an upper article supporting surface and a leading edge generally transverse to the incline. The leading edge of plates proximate the in-feed end are of greater depth than those further along the path toward the out-feed end. The units are supported on the support structure to move relative thereto and one another. The units are driven in synchronized out of phase relation reciprocating along the inclined path. A hopper at the in-feed end receives and holds a supply of lumber pieces of selected dimension and as the plates reciprocate they move pieces of the lumber from the hopper to the out-feed end discharging normally only a single stick one after another.

25 Claims, 5 Drawing Sheets

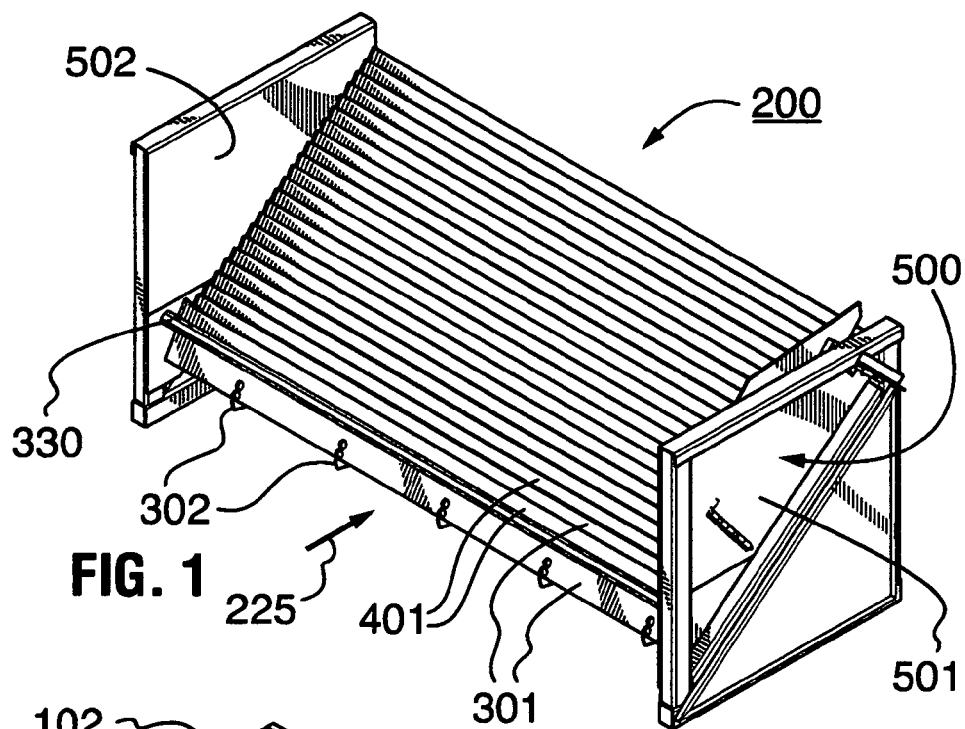
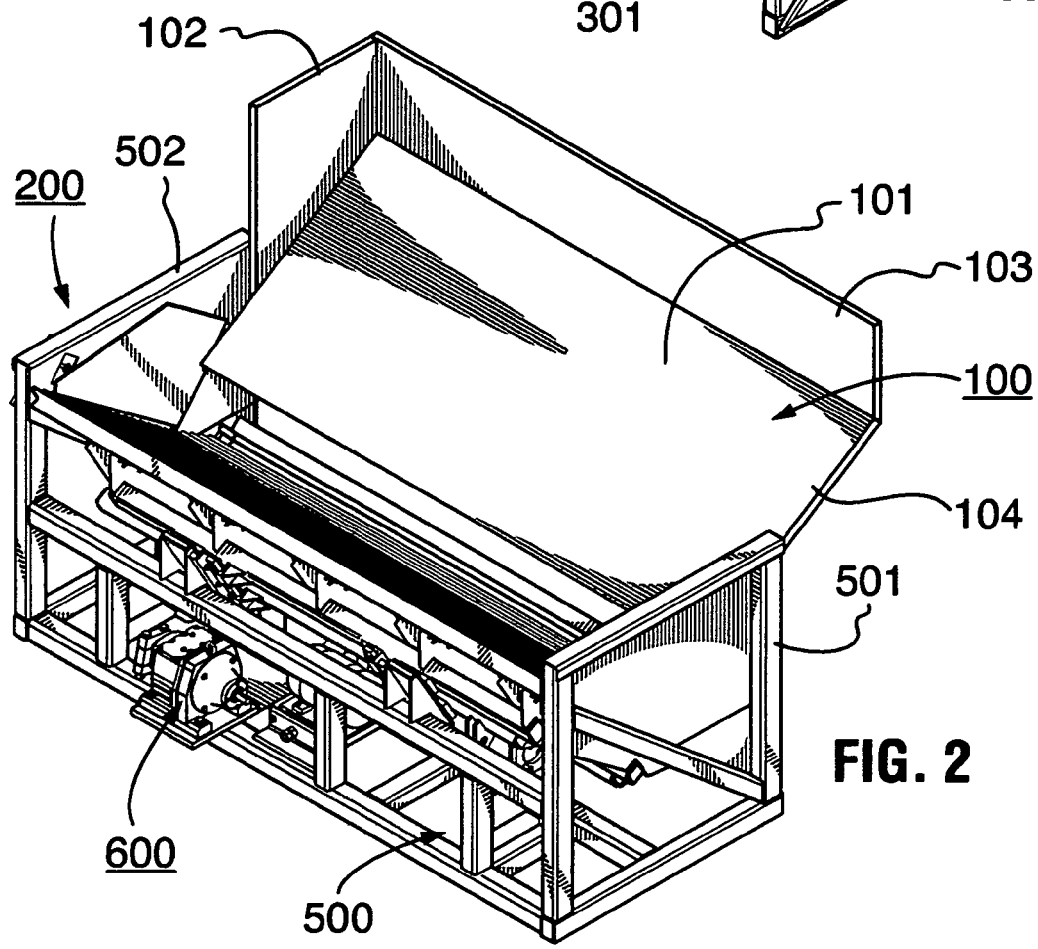

LUMBER UNSCRAMBLER AND CONVEYOR

FIELD OF INVENTION

This invention relates to an apparatus for unscrambling pieces of lumber located at a first location and delivering such pieces normally one at a time in sequence at a second location spaced from and higher in elevation than said first location.

BACKGROUND OF INVENTION

It is common practice to-day to manufacture finger joint lumber as it reduces waste and provides a good product. As an example long lengths (40 feet or more) of 2"×4" or 2"×3" lumber are made by joining end-to-end a number of short lengths. The short lengths may vary in length from about 18 inches to about 7 feet. The long lengths (i.e. 40 feet or more) are then cut to exact lengths and which may for example be the length required for selected jobs. Wall studs for example in house construction are normally shorter than the conventional 8 foot length commonly available at a lumber yard. Each 8 foot length therefore must be cut at the job site resulting in considerable waste. Manufacturing to exact length not only reduces wastage at the job site but also eliminates a cutting step for the contractor. Also any left over pieces at the mill can be reprocessed.

During finger jointing each piece to be joined to another must have "V" notches cut in the ends thereof. This requires placing the pieces to be joined one stick at a time one after another on a conveyor that feeds the pieces to the finger jointing assembly line. An apparatus capable of receiving and holding numerous pieces to be finger jointed and then delivering therefrom one at a time (i.e. singulating) to the infeed end of the finger jointing assembly line speeds up the process and reduces the manual labor required.

U.S. Pat. No. 5,351,729, issued Oct. 4, 1994, Inventor Maurice J Brisson, discloses an apparatus for unscrambling and moving logs up an inclined path. The path has a direction transverse to the length of the logs and the logs rest in notches in vertically disposed, parallel, horizontally spaced apart, plates. In the patented apparatus the logs have to be longer than the spacing between the plates and thus is limited in that respect. First and second groups of such plates are reciprocated in an out of phase relation causing the logs to move one notch at a time. The two groups of plates are connected to a rigid support frame by link members. Some of the plates are interconnected by horizontal plates while others are not.

There is debris associated with log conveying that includes pieces of bark, chips and the like. In the above patented apparatus this debris falls between the vertically disposed plates dropping into the drive mechanism below or alternatively slides down a plate that joins together two adjacent plates and accumulates in hard to get at piles at the front of the apparatus.

Other patents on this subject are as follows:
Canadian Patents
2,319,330 Issued Feb. 12, 2002
2,271,931 Issued Dec. 28, 1999
2,270,484 Issued Oct. 17, 2000
2,105,219 Issued May 14, 1996 (corresponds to above mentioned U.S. Pat. No. 5,374,157)
2,074,645 Issued Aug. 29, 1995 (Corresponds to U.S. Pat. No. 5,351,729).

The above Canadian Patent 2,319,330 discloses two groups of overlapping platforms that reciprocate along inclined paths in an out of phase relation. Each platform has a leading edge and when the leading edges of the two groups are closely adjacent an article on the face of one platform in one group transfers to the face of a platform in the other group.

The forgoing references disclose the use of link arms to mount the movable assemblies on the support structure—see 2,074,646 and 2,105,219 or linear slide bearings—see 2,270,484, 2,271,931 and 2,319,330. The latter patent also discloses having the platforms sufficiently close as to be capable of moving debris along with the articles.

The forgoing references are not concerned with singulating pieces of lumber.

Lumber pieces are rectangular and of specific dimensions and therefor they need special consideration not applicable to unscrambling and handling of round logs.

Also the prior art is not concerned with the infeed to the apparatus nor details of construction of the infeed end of the apparatus.

In the patented apparatus the depth of the leading edge of each is of the same.

SUMMARY OF INVENTION

A principal object of the present invention is to provide a smooth operating rigid apparatus that conveys and unscrambles pieces of lumber between an input end and an output end of the apparatus delivering normally a single piece, one at a time, one after another at the output end. Such apparatus has use in feeding pieces of lumber for example to further apparatus that processes one piece of lumber one after another in sequence.

In keeping with the forgoing object there is provided in accordance with the present invention an apparatus for unscrambling and moving pieces of lumber comprising a first and second pair of rigid frame assemblies mounted on a support structure and each having a series of parallel partially overlapping plates spaced apart a selected distance from one another, said plates of one unit being disposed in interleaved overlapping relation with those of the other unit, means mounting said respective rigid frame assemblies on said support structure for movement along respective predetermined paths, drive means for moving said units comprising a linkage system connected to said respective rigid frame assemblies to move the same in synchronized out of phase relation and wherein plates at an input end of the apparatus have a greater thickness than plates downstream therefrom towards an output end of the apparatus.

There is also provided in accordance with the present invention an apparatus comprising a first group of parallel plates on a rigid frame with such plates being spaced apart a selected distance from one another and a second group of parallel plates on a second rigid frame and spaced apart a selected distance from one another, said first and second groups of plates being inter-leaved with one another in alternate relation along an inclined path and means mounting said frames for reciprocal movement to move the plates of said first and second groups relative to one another in an out of phase relation, each said plate having a leading edge of selected depth and wherein such leading edge of plates at the beginning of the inclined path are of greater depth than that of plates downstream therefrom at a higher elevation.

The term normally is used herein to avoid an interpretation that a single stick is delivered 100 percent of the time. An operating prototype did not deliver solely one stick every time but did deliver in most instances one stick and it has been estimated to do so at least 90 percent of the time.

LIST OF DRAWINGS

The invention is illustrated, by way of example, in the accompanying drawing wherein:

FIG. 1 is an oblique partial view of applicants lumber unscrambling and conveying apparatus;

FIG. 2 is an obligue view of the apparatus of FIG. 1 but from the other side and including a hopper at the infeed end of the conveyor;

FIGS. 4–6 are various views of one of two rigid frame assemblies of applicants apparatus in which;

FIG. 4 is a bottom view:

Figure 3:
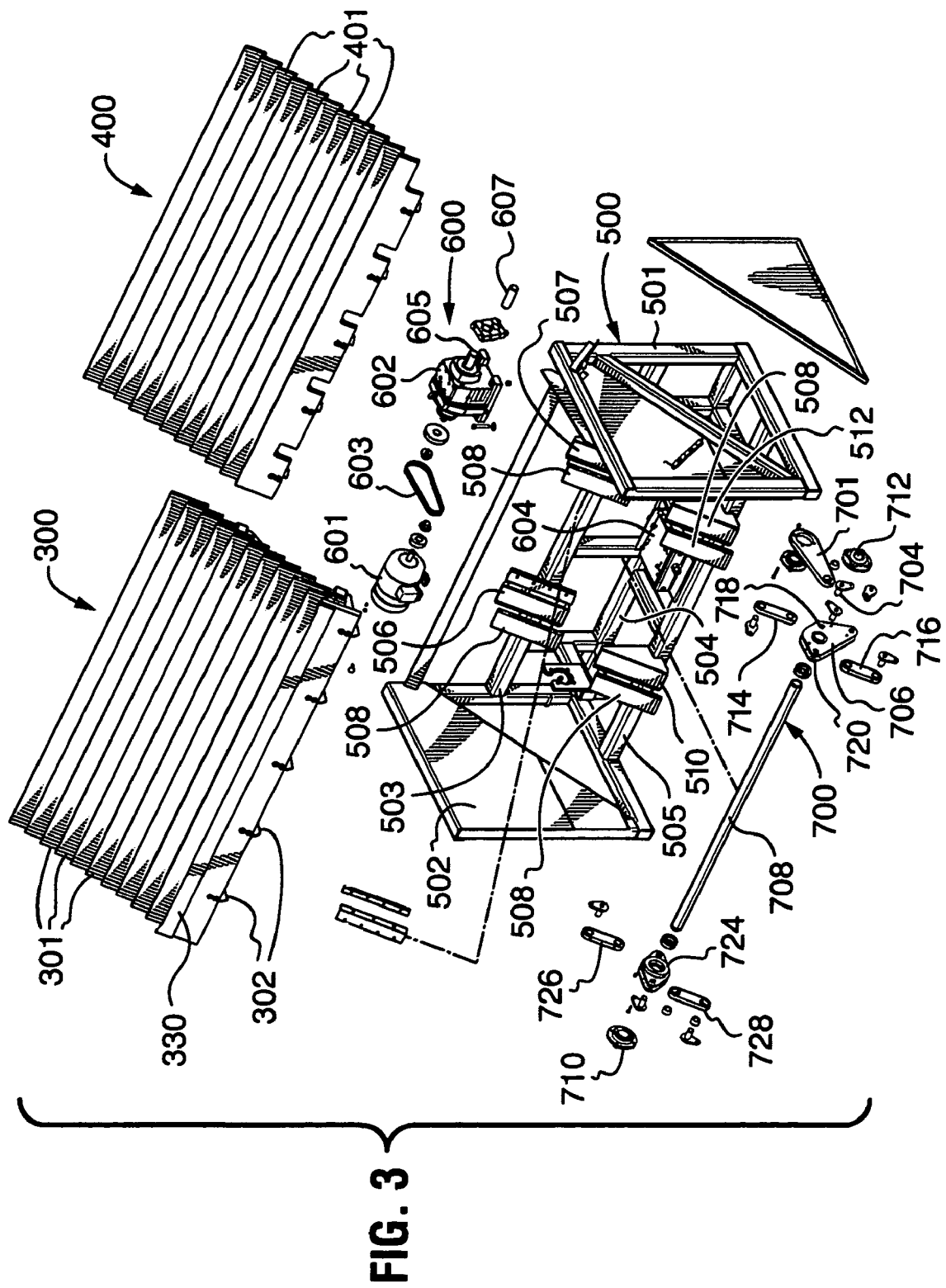
FIG. 3 is an exploded view showing the components of the apparatus shown in FIG. 1.
Figure 4:
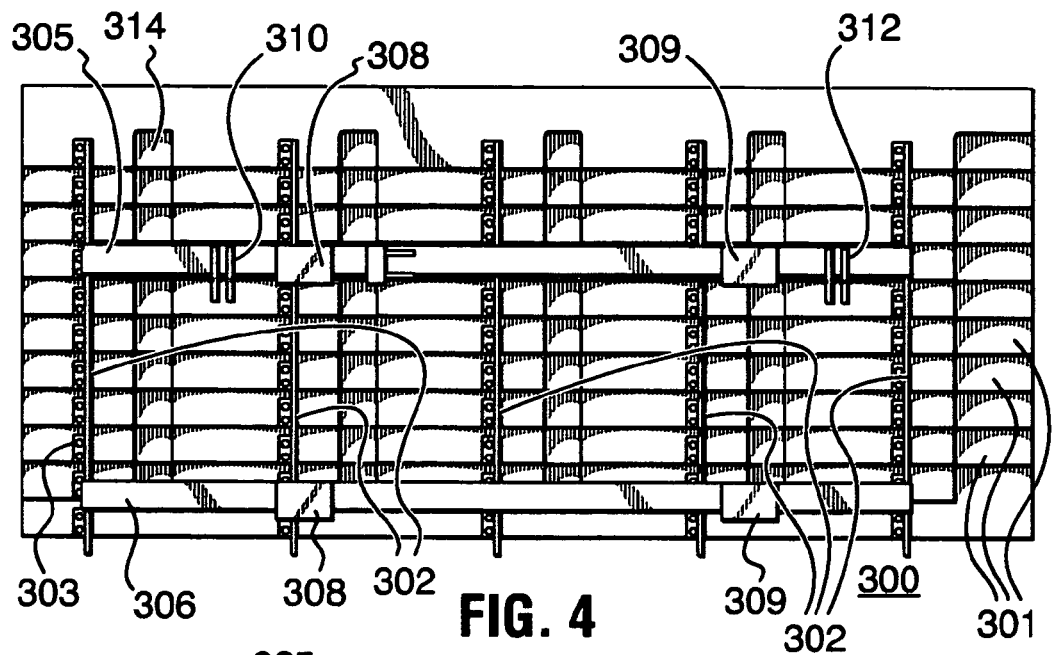
Figure 5:
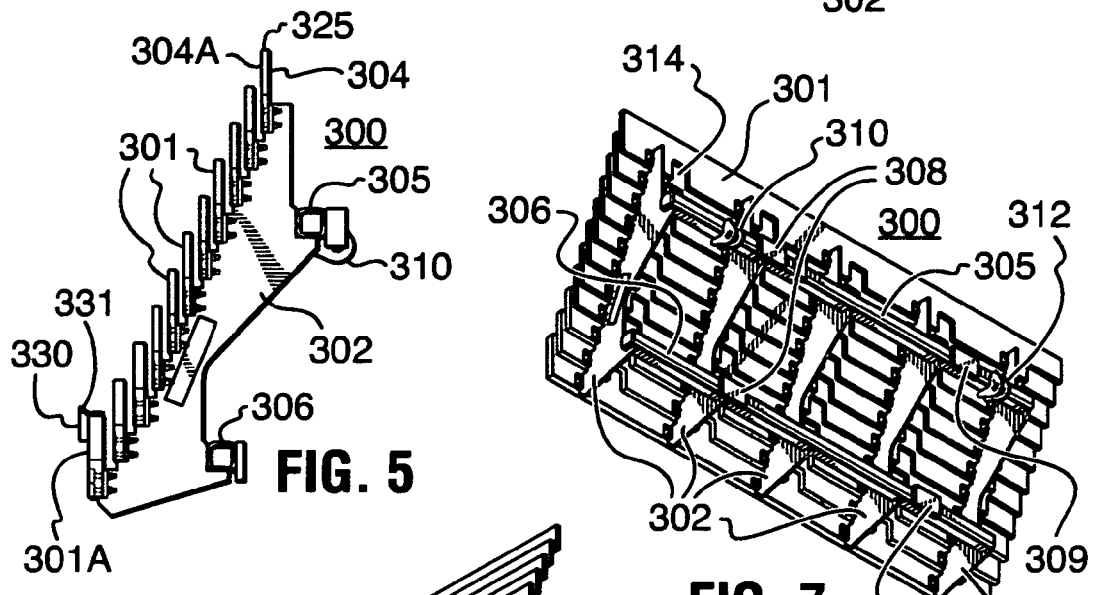
Figure 7:
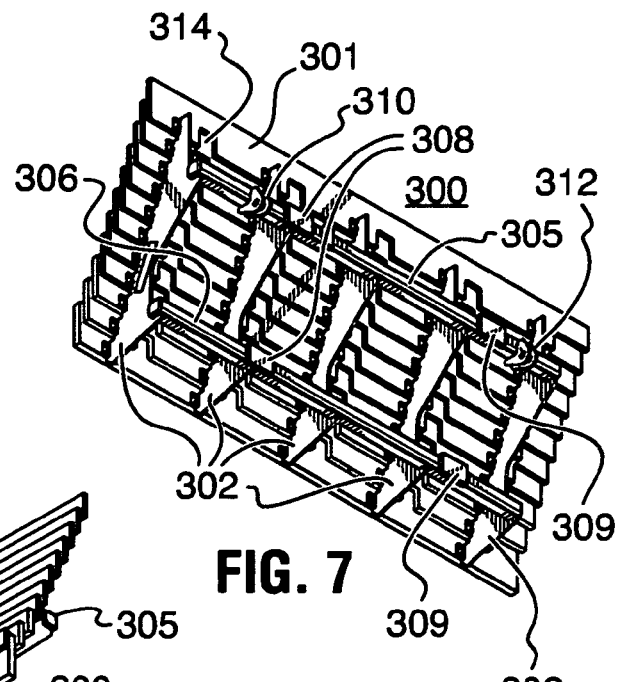
Figure 6:
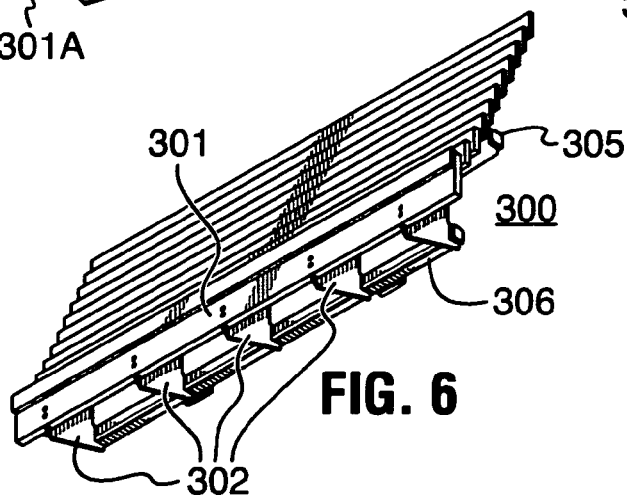
Figure 8:
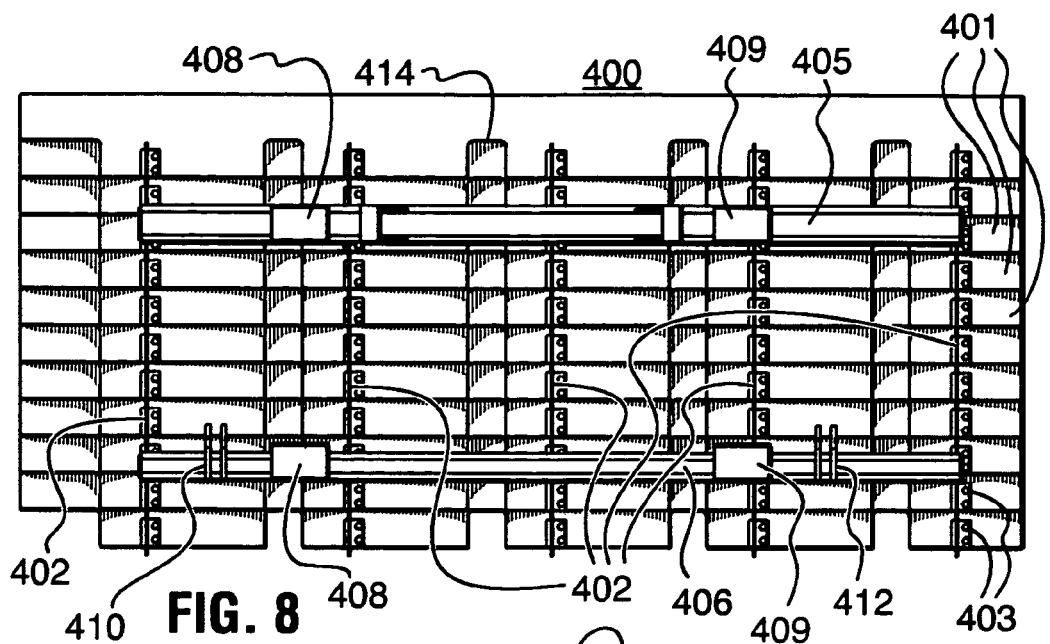
Figure 9:
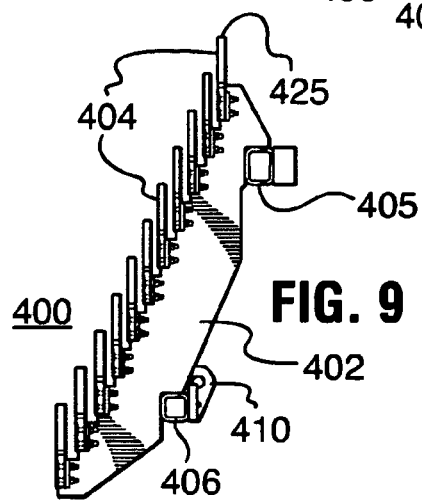
Figure 10:
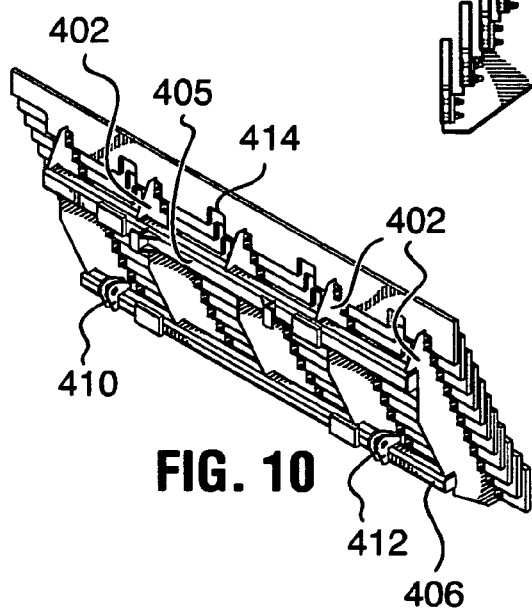
Figure 11:
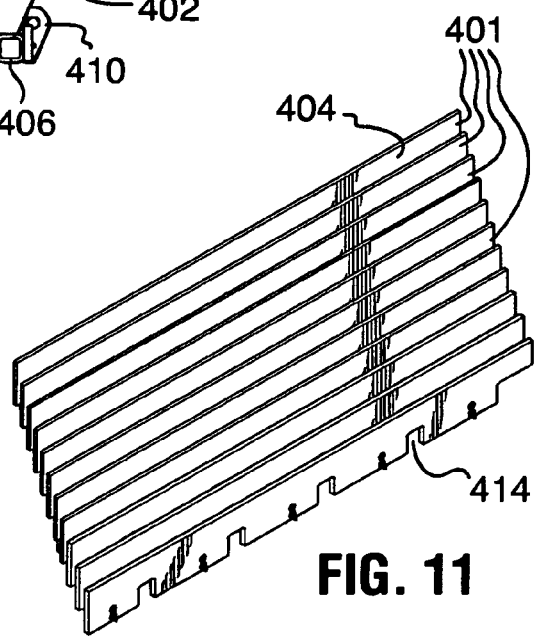

FIG. 5 a side view:

FIG. 6 an oblique view of the top side commencing at the lead input end:

FIG. 7 an oblique view of the bottom side:

FIGS. 8–11 are various views of the second one of the two rigid frame assemblies in which;

FIG. 8 is a bottom view:

FIG. 9 is a side view:

FIG. 10 is an oblique view from the bottom side:

FIG. 11 is an oblique view from the top side; and

Figure 12:
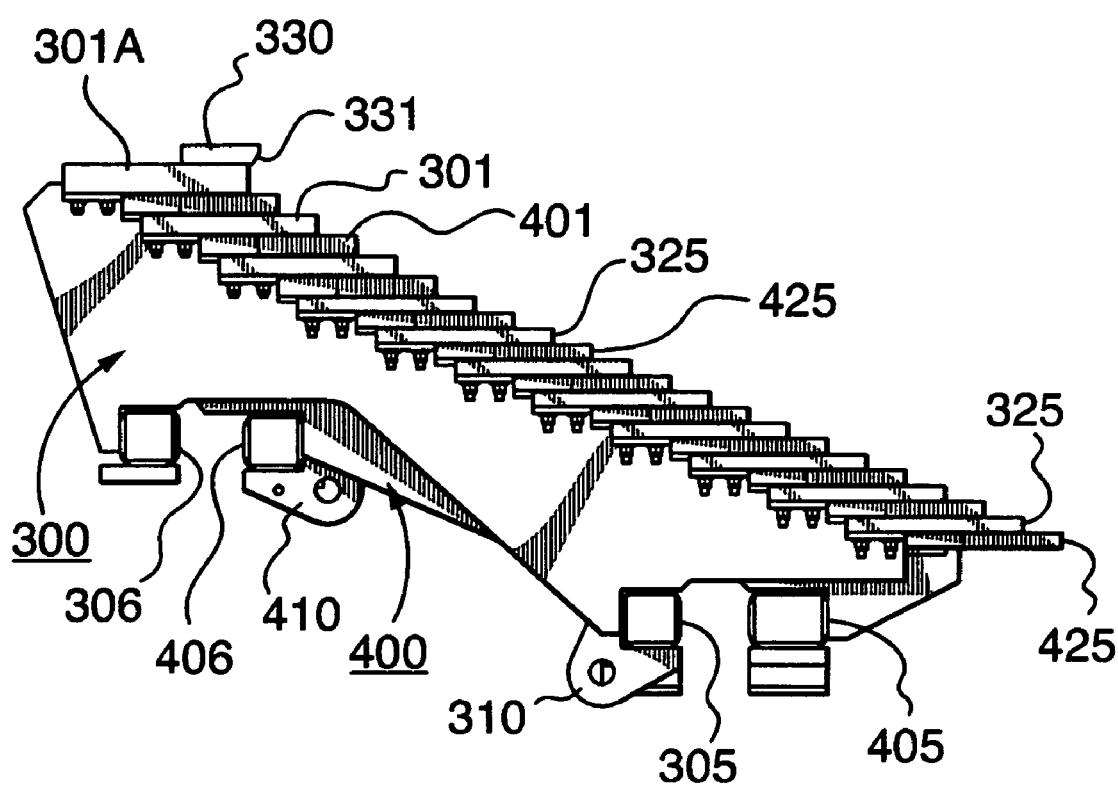

FIG. 12 is a side elevational view of the two rigid frame assemblies in which the plates of the respective units are inter-leaved in partial overlapping relation.

PREFERRED EMBODIMENT

Referring to the drawings there is illustrated a lumber handling system that receives and retains numerous pieces of lumber in a hopper at the infeed end thereof and delivers such pieces at an output end of the system one piece of lumber in sequence one after another. The lumber handling system comprises a hopper 100 at the in-feed end of a lumber unscrambler and conveyor 200.

The apparatus 200 comprises first and second respective rigid frame assemblies or units 300 and 400 mounted on a rigid support structure 500 for movement relative thereto and one another along predetermined paths. The units 300, 400 are driven by a motor drive means 600 and a linkage system 700 drivingly connected thereto to reciprocate the units in synchronized out of phase (preferably 180 degree) relation.

The unit 300 comprises a series of plates 301 disposed in spaced apart parallel overlapping relation. The plates are secured (preferably detachably secured) to a plurality of ribs 302 by suitable means such as bolt and nut units 303. Each plate 301 has a flat bottom face 304 that in part, as will become apparent hereinafter, is in partial face-to-face relation with an upper face of a similar plate on the rigid frame assembly 400. The ribs 302 project downwardly from the plates and are rigidly secured as by welding or the like to a pair of cross-beams 305, 306.

There are two spaced apart bearing pads 308, 309 of suitable material e.g. steel on each of the cross-beams. Two sets of lugs 310, 312 are secured to the cross-beam 305 and provide bracket means for connecting thereto links of the linkage system.

There are five ribs 302 illustrated and the unit 400 similarly has five ribs spaced a selected distance from one another. Each plate 301 has a notch 314 in a trailing edge thereof corresponding in position,spacing and number to that of the ribs on the unit 400.

The unit 400 is constructed as described above with respect to the unit 300 and comprises a series of plates 401 disposed in spaced apart parallel partially overlapping relation and are secured to a plurality of ribs 402. The plates are preferably detachably secure to the ribs by suitable means such as bolt and nut units 403. Each plate 401 has a flat upper face 404 that is disposed in face-to-face partial overlapping relation with the lower face 304 on the plates 301 of the rigid frame assembly 300. The ribs 402 project downwardly from the plates and are rigidly secured as by welding or the like to a pair of spaced apart cross-beams 405, 406.

There are two steel, or other suitable material, spaced apart bearing pads 408, 409 on each of the cross-beams. Pairs of lugs 410, 412 are secured to the cross-beam 406 and provide bracket means for connecting thereto links of the linkage system.

There are five ribs 402 spaced a selected distance from one another. Each plate 401 has a notch 414 in a trailing edge thereof corresponding in location, spacing and number to that of the ribs on the unit 300.

The rigid support structure 500 comprises respective vertical end frames 501, 502 spaced apart from one another and interconnected by spaced apart cross beams 503, 504 and 505. A pair of bearing blocks 506, 507 are mounted on the beam 503 and each has a nylon or the like replaceable wear plate 508 secured thereto. Similarily there are bearing blocks 510, 512 mounted on the beam 505 and each has a replaceable nylon wear pad 508 secured thereto. The end frames 501, 502 have planar faces facing one another and hold the assemblies 300, 400 captive there between by engagement of the ends of the plates with such surfaces.

As previously mentioned the two units move relative to one another in opposite directions of travel without interference even though the faces of the overlapping portions of the plates of the respective units are closely adjacent one another. In a successfully operated prototype the amount of travel was 2 inches.

The rigid units 300 and 400 are moved back and forth in their respective paths in synchronized 180 degree out of phase relation by the drive means 600 and linkage system 700 drivingly connected thereto. The drive means 600 includes a motor 601 driving a speed reducer 602 via a v-belt 603. The motor 601 and speed reducer 602 are mounted on a base plate 604 secured to the cross beams 504, 505 of the support structure 500. An output shaft 605 has a crank arm 607 connected thereto which in turn is connected to one end of a link 701 of the linkage system 700. The other end of that link is connected by a pin 704 to a plate or crank arm 706 that is secured to and radiates outwardly from a shaft 708. The shaft 708 is journaled on the frame 500 by suitable bearing means 710, 712.

In operation the motor drives the speed reducer and the shaft 708 is caused to oscillate about it's longitudinal axis. A pair of links 714, 716 have one end thereof connected by pin means to respective holes 718, 720 that are off-set equally from the longitudinal axis of the shaft 708. The opposite ends of the links 714, 716 are connected respectively to the brackets 310, 410 of the respective assemblies 300, 400. An arm 724 is secured to the shaft 708 at the other end thereof and by suitable pin means connects to a respective one of links 726, 728. The other end of the links are connected to respective brackets 312, 412 on the frames 300, 400. The units are synchronized so that as one of the units 300,400 is moving up the incline the other is moving down at the same rate and distance in the opposite direction. When the leading edges 325, 425 of adjacent plates are closely adjacent one another a piece of lumber resting on the face a plate on one unit transfers to the face of an adjacent plate in the other unit.

The reciprocating units move the pieces of lumber progressively from a first position to a second position in which the second position is at a higher elevation than the first. The leading edge of the plates pushes the pieces of lumber. The unscrambler is useful in feeding single pieces of lumber to a conveyor that is an in-feed to a wood processing apparatus or system.

Since the units 300 and 400 travel in parallel paths they can be closely adjacent one another without one unit running into interference from the other. The close proximity to the two units prevents debris from dropping through and thus is carried to the top and is pushed by the last plate at the outlet end of the conveyor.

The rigid units are assisted by gravity on their downward direction of travel and this is transferred to the ascending unit through the drive linkage system. One or more air bellows springs or cushions maybe mounted on the support structure so as to be struck by some part of the frame of the rigid units before reaching their bottom point of travel. The air cushions not only can cushion the fall but the energy build up can be used to assist in the initial acceleration of the unit as it begins its travel upward and thus have a fly wheel effect on the masses reciprocating in an inclined plane.

The plates 301, 401 on the respective units 300 and 400 are preferably nylon, teflon or the like so that the lumber piece can readily slide thereon. In a prototype apparatus the plates 301, 401 had the leading edges in the respective units offset from one another 4" resulting in a maximum offset of 2" in the leading edge of a plate 301 and the next adjacent plate 401. In the unit 300 the first plate 301 at the in-feed end, which is designated 301A in FIG. 5, had a thickness of 1.5" and the next two a thickness of 1" while the remaining downstream therefrom had a thickness of 0.75". The plate designated 301A also has a piece 330 attached thereto and which provides an end face 331 that slopes toward the 1.5" inch thick leading edge of the plate 301A. The piece 330 is preferably detachably secured to the plate associated therewith so that when it becomes worn due to usage it can be replaced as and when required.

The first three plates 401 beginning at the infeed end had a thickness of 1" while the remainder downstream therefrom had thickness of 0.75" The spacing between adjacent faces of plates 301 and 401 was 1/16".

The hopper 100 has a bottom wall 101, a vertical end, wall 102, a back wall 103 and an open front wall 104. The bottom wall 101 slopes downwardly toward the infeed end, designated by the arrow 225 in FIG. 1, of the lumber unscrambler and conveyor 200. Pieces of wood varying in length from about 18 inches to 7 feet are dumped into the hopper or delivered thereto end wise by a belt conveyor having a discharge at the hopper open end wall 104. The lumber pieces engaging the reciprocating relatively moving plates gradually are separated and delivered as single pieces. The varying thickness of the plates facilitates the separation process helping ensure the pieces are delivered one at a time.

The forgoing plates obviously can be replaced by members that are "L" shaped in cross-section providing a leading edge and an upper face of equivalent dimension for supporting a piece of lumber. While the plates are described as being made of nylon or the like they can be made of other materials such as metal and have a surface coating at least on the face supporting the lumber pieces that is made of a wear and friction resistant material such as nylon, teflon or the like.

We claim:

1. Apparatus for moving pieces of lumber along an inclined path from a group of such pieces at a first in-feed location and delivering them at a second out-feed location normally one stick at a time with said second location being disposed at a higher elevation than said first location, said apparatus comprising: a rigid support structure; first and second rigid frame assemblies; and means mounting said frame assemblies on said support structure for movement relative thereto and one another along predetermined inclined paths, said first and second rigid assemblies each having a plurality of plates mounted thereon, said plates being spaced apart from one another on their respective rigid frames and disposed such that the plates on one frame assembly are interleaved with the plates on the other frame assembly, said plates on the respective frame assemblies having a leading edge angularly disposed relative to said inclined path and wherein the leading edge of plates in proximity of the in-feed location are of greater thickness than that of plates located downstream therefrom in a direction toward the out-feed location.

2. Apparatus for moving pieces of lumber comprising a first and a second pair of rigid frame assembly units each having a plurality of parallel spaced apart plates mounted thereon, said rigid units being disposed such that the plates on one unit are interleaved with the plates on the other unit and disposed in overlapping relation along an inclined path on a support structure from an in-feed end to an out-feed end and in which the out-feed end is at a higher elevation than the in-feed end, means mounting said units on said support structure for movement in a direction parallel to said inclined path, and drive means comprising a linkage system connected to said respective units to reciprocate the same in synchronized out of phase relation, each said plate having a leading edge of selected thickness and wherein that thickness is greater for plates proximate the in-feed end than that of plates downstream therefrom toward the out-feed end.

3. A conveyor as defined in claim 2 wherein said drive linkage comprises a power driven shaft having a crank arm attached thereto and link means connecting the same to respective ones of said units.

4. The apparatus as defined in claim 2 wherein said rigid units are reciprocally moveable along linear paths.

5. The apparatus of claim 1 including an additional nose piece on a first one of said plates at the in-feed end of the apparatus.

6. The apparatus of claim 2 including an additional nose piece on a first one of said plates at the in-feed end of the apparatus.

7. The apparatus of claim 5 wherein said additional nose piece has a leading edge that projects forwardly beyond and spaced from the leading edge of the plate associated therewith.

8. The apparatus of claim 6 wherein said additional nose piece has a leading edge that projects forwardly beyond and spaced from the leading edge of the plate associated therewith.

9. The apparatus of claim 1 including an additional nose piece and means detachably mounting said additional nose piece on a first one of said plates at the in-feed end of the apparatus.

10. In an apparatus having a first and a second pair of rigid frame assembly units movably mounted on a frame for movement relative thereto and one another, each such unit having a plurality of parallel spaced apart plates with the rigid units disposed such that the plates on one unit are interleaved in alternate relation with the plates on the other unit in overlapping relation along an inclined path, each such plate having an article supporting face surface and a leading edge angularly disposed relative thereto and drive means comprising a linkage system connected to said respective units to reciprocate the same in synchronized out of phase relation the improvement comprising each said plate having a leading edge of selected thickness and wherein that thickness is greater for plates proximate the in-feed end of the apparatus than that of plates downstream therefrom toward an out-feed end.

11. Apparatus for moving pieces of lumber along an inclined path from a group of the same at a first in-feed location and delivering them in sequence one after another normally one stick at a time at a second out-feed location disposed at a higher elevation than said first location, said apparatus comprising a rigid support structure; first and second rigid frame assembly units; means mounting said first and second units on said support structure for reciprocal movement relative thereto along parallel inclined paths; a first and second plurality of plates mounted respectively on said first and second rigid units, said plates being spaced apart from one another on their respective rigid units and arranged with the plates on one unit interleaved in alternate relation with the plates on the other unit, each said plate on the respective units having an upwardly facing article supporting face leading edge disposed generally transverse to said inclined paths and wherein such leading edge of plates proximate said in-feed end is of greater thickness than that of plates downstream therefrom.

12. The apparatus of claim 1 including a hopper disposed proximate said first location, said hopper having a bottom wall for supporting a plurality of pieces of said lumber and sloping in a direction downwardly in a direction toward the plates at the in-feed end of the apparatus.

13. The apparatus of claim 2 including a hopper disposed proximate said first location, said hopper having a bottom wall for supporting a plurality of pieces of said lumber and sloping in a direction downwardly in a direction toward the plates at the in-feed end of the apparatus.

14. The apparatus of claim 10 including a hopper disposed proximate said first location, said hopper having a bottom wall for supporting a plurality of pieces of said lumber and wherein said bottom wall slopes downwardly in a direction toward the plates at the in-feed end of the apparatus.

15. The apparatus of claim 11 including a hopper disposed proximate said first location, said hopper having a bottom wall for supporting a plurality of pieces of said lumber and wherein said bottom wall slopes downwardly in a direction toward the plates at the in-feed end of the apparatus.

16. The apparatus of claim 13 including an additional nose piece on a first one of said plates at the in-feed end of the apparatus.

17. The apparatus of claim 14 including an additional nose piece on a first one of said plates at the in-feed end of the apparatus.

18. The apparatus of claim 15 including an additional nose piece on a first one of said plates at the in-feed end of the apparatus.

19. The apparatus of claim 16 wherein said additional nose piece has a leading edge that projects forwardly beyond and spaced from the leading edge of the plate associated therewith.

20. The apparatus of claim 17 wherein said additional nose piece has a leading edge that projects forwardly beyond and spaced from the leading edge of the plate associated therewith.

21. The apparatus of claim 18 wherein said additional nose piece has a leading edge that projects forwardly beyond and spaced from the leading edge of the plate associated therewith.

22. The apparatus of claim 1 wherein said pieces of lumber are nominal 2"×4" or 2"×3" of various lengths, first plate at the in-feed end is on said first rigid unit, wherein such plate has a leading edge whose depth is 1.5", wherein the leading edge of the next succeeding plate on that same unit is 1" and wherein the plate disposed between the two forgoing plates is 1" and located on said second rigid unit.

23. The apparatus of claim 2 wherein said pieces of lumber are nominal 2"×4" or 2"×3" of various lengths, wherein the first plate at the in-feed end is on said first rigid unit, wherein such plate has a leading edge whose depth is 1.5", wherein the leading edge of the next succeeding plate on that same unit is 1" and wherein the plate disposed between the two forgoing plates is 1" and located on said second rigid unit.

24. The apparatus of claim 11 wherein said pieces of lumber are nominal 2"×4" or 2"×3" of various lengths, wherein the first plate at the in-feed end is on said first rigid unit, wherein such plate has a leading edge whose depth is 1.5", wherein the leading edge of the next succeeding plate on that same unit is 1" and wherein the plate disposed between the two forgoing plates is 1" and located on said second rigid unit.

25. The apparatus of claim 12 wherein said pieces of lumber are nominal 2"×4" or 2"×3" of various lengths, wherein the first plate at the in-feed end is on said first rigid unit, wherein such plate has a leading edge whose depth is 1.5", wherein the leading edge of the next succeeding plate on that same unit is 1" and wherein the plate disposed between the two forgoing plates is 1" and located on said second rigid unit.

* * * * *